United States Patent
Schiffers et al.

(10) Patent No.: US 8,201,668 B2
(45) Date of Patent: Jun. 19, 2012

(54) SELF-ENERGIZING HYDRAULIC BRAKE

(75) Inventors: Toni Schiffers, Erkelenz (DE);
Christian Stammen, Holzwickede (DE)

(73) Assignee: Siemens Aktiengesellschaft, Munich (DE)

( * ) Notice: Subject to any disclaimer, the term of this patent is extended or adjusted under 35 U.S.C. 154(b) by 370 days.

(21) Appl. No.: 12/441,395

(22) PCT Filed: Aug. 23, 2007

(86) PCT No.: PCT/EP2007/058767
§ 371 (c)(1),
(2), (4) Date: Mar. 16, 2009

(87) PCT Pub. No.: WO2008/031701
PCT Pub. Date: Mar. 20, 2008

(65) Prior Publication Data
US 2010/0019567 A1    Jan. 28, 2010

(30) Foreign Application Priority Data
Sep. 15, 2006  (DE) .......................... 10 2006 044 022

(51) Int. Cl.
*F16D 55/46*    (2006.01)
(52) U.S. Cl. ........................ 188/72.2; 303/112
(58) Field of Classification Search ............... 188/70 R, 188/70 B, 72.2, 151 R, 346, 170; 303/15, 303/155, 112, 20, DIG. 1, DIG. 2
See application file for complete search history.

(56) References Cited

U.S. PATENT DOCUMENTS

| | | | |
|---|---|---|---|
| 3,173,517 A * | 3/1965 | Powlas .......................... | 188/346 |
| 3,261,432 A * | 7/1966 | Tournier .................... | 188/140 R |
| 3,277,982 A | 10/1966 | Kimberlin | |
| 3,348,637 A * | 10/1967 | Perez ............................. | 188/346 |
| 3,368,651 A * | 2/1968 | Lepelletier .................... | 188/346 |
| 3,700,075 A | 10/1972 | Mortimer et al. | |
| 3,716,118 A | 2/1973 | Gelhaar | |
| 3,872,952 A * | 3/1975 | Poggie ........................ | 188/181 T |
| 3,880,476 A * | 4/1975 | Belart et al. ................ | 303/119.2 |
| 5,036,960 A | 8/1991 | Schenk et al. | |
| 5,168,966 A | 12/1992 | Thioux et al. | |
| 5,379,868 A | 1/1995 | Kurasako et al. | |
| 5,544,724 A | 8/1996 | Kurasako | |
| 5,775,782 A | 7/1998 | Akita et al. | |
| 5,779,325 A * | 7/1998 | Diesel ............................. | 303/72 |

(Continued)

FOREIGN PATENT DOCUMENTS
DE    1530869 A1    2/1969
(Continued)

*Primary Examiner* — Bradley King
*Assistant Examiner* — Nicholas J Lane
(74) *Attorney, Agent, or Firm* — Laurence A. Greenberg; Werner H. Stemer; Ralph E. Locher

(57) ABSTRACT

A device for decelerating or braking a moving mass includes a movably guided coupling member for pressing a brake lining against a braking surface and a brake actuator, filled with hydraulic liquid and connected to the coupling member, for generating a pressure force that can be passed into the brake lining through the coupling member. The brake lining is connected to a pressure transducer that can be fastened on a frame of the mass to be decelerated or braked through a connecting device. The pressure transducer has a hydraulic liquid-filled supporting cylinder and a supporting piston interacting therewith. The supporting cylinder communicates with a brake cylinder through hydraulic lines. This allows an improved adjustment of deceleration or braking. For this purpose, a regulating device adjusts the brake force depending on a predetermined theoretical value.

15 Claims, 4 Drawing Sheets

U.S. PATENT DOCUMENTS

| | | | |
|---|---|---|---|
| 6,594,993 B1 * | 7/2003 | Friedrichsen et al. | 60/442 |
| 6,929,103 B2 | 8/2005 | Cannata | |
| 7,559,412 B2 * | 7/2009 | Murayama | 188/72.2 |
| 2010/0032249 A1 * | 2/2010 | Baumann et al. | 188/72.2 |

FOREIGN PATENT DOCUMENTS

| | | |
|---|---|---|
| DE | 1808123 A1 | 5/1970 |
| DE | 2914626 A1 | 11/1980 |
| DE | 3441128 A1 | 5/1986 |
| DE | 4304905 A1 | 8/1994 |
| EP | 0459855 A1 | 12/1991 |
| EP | 0566133 A1 | 10/1993 |
| GB | 1019982 | 2/1966 |
| GB | 1031116 | 5/1966 |
| GB | 1225879 | 3/1971 |
| JP | 2001301594 A | 10/2001 |
| RU | 2115576 C1 | 7/1998 |
| TW | 491783 B | 6/2002 |

* cited by examiner

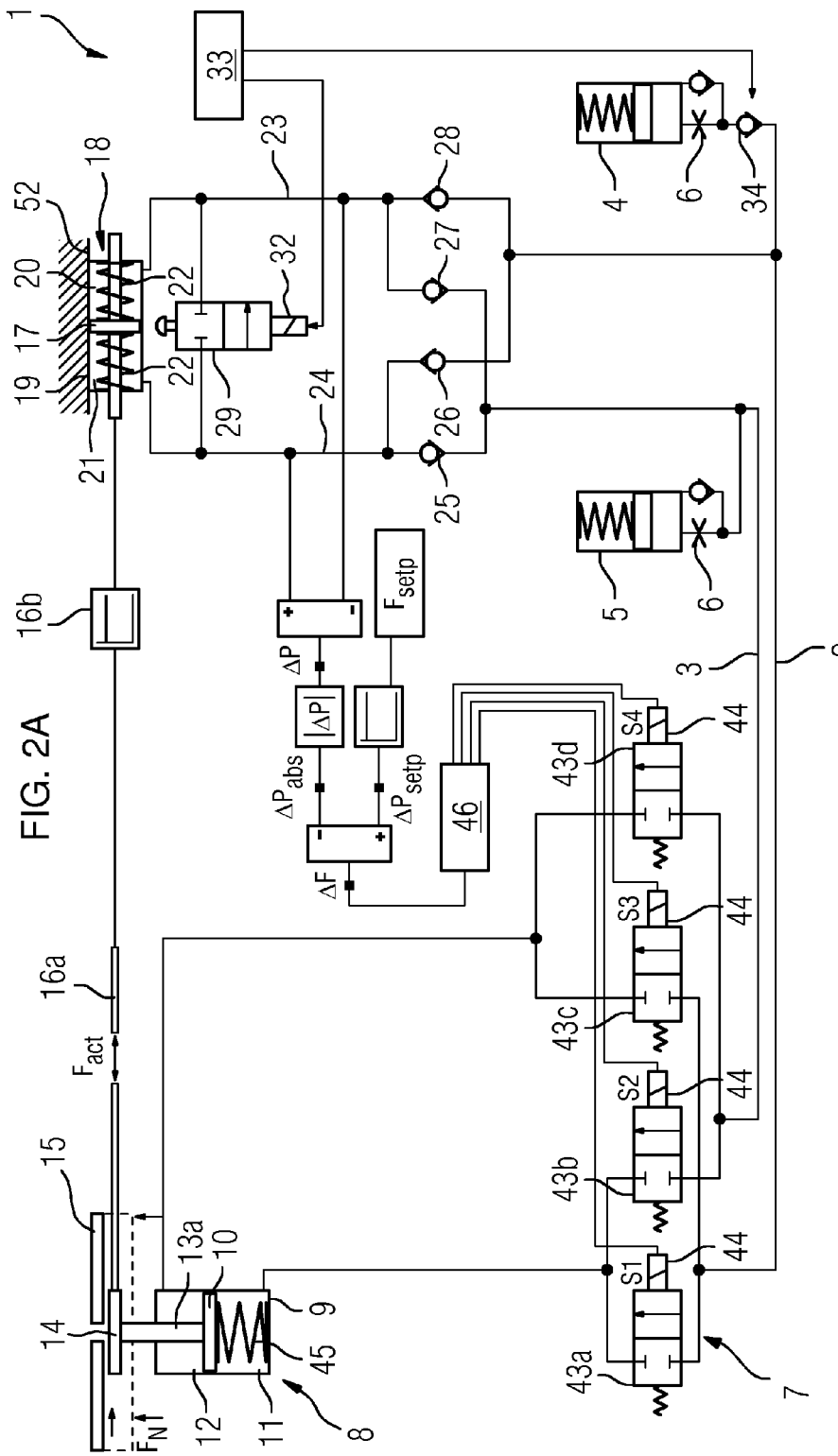

SELF-ENERGIZING HYDRAULIC BRAKE

BACKGROUND OF THE INVENTION

Field of the Invention

The invention relates to a device for decelerating a moving mass, comprising a movably guided coupling element for pressing a brake lining against a braking surface, and a brake actuator which is filled with hydraulic fluid, is connected to the coupling element and has the purpose of generating a pressing-on force which can be applied to the brake lining via the coupling element, wherein the brake lining is connected via connecting means to a pressure transducer which can be attached to a frame of the mass to be decelerated and which has a supporting cylinder which is filled with hydraulic fluid and a supporting piston which interacts with said supporting cylinder, and wherein the supporting cylinder communicates with the brake cylinder via hydraulic lines.

Such a device is already known from DE 34 41 128 A1. The device disclosed in said document has a brake actuator which comprises a brake cylinder which is filled with hydraulic fluid, wherein a moving part which projects into the cylinder and comprises a brake applying device for pressing a brake lining against a brake disk is provided. The brake actuator is part of a brake caliper which is guided in a movable fashion on a pitch circle. A cylinder bore is provided as a supporting cylinder, tangentially with respect to the pitch circle, wherein a supporting piston, which is supported on a chassis of a mass to be decelerated, projects into the supporting cylinder. If the hydraulic pressure in the brake cylinder is increased, the brake linings are pressed against a brake disk which rotates in the direction of travel. Frictional locking occurs and therefore the brake caliper moves tangentially with respect to the direction of rotation of the brake disk, wherein the supporting piston which is supported on the chassis and projects into the supporting cylinder is moved deeper into the supporting cylinder. The supporting cylinder is filled with a hydraulic fluid whose pressure is increased. The supporting cylinder is connected to the brake cylinder via a hydraulic line, with the result that power boosting occurs which is strictly predefined.

GB 1,019,982 describes a device comprising a spreading element which is arranged inside a brake disk and is provided as a brake applying device for pressing a brake lining against a brake disk. In this context, the spreading element is pivotably mounted. Owing to the deceleration force occurring in the case of braking, the brake disk is pivoted as a function of the direction of rotation. In this context, the spreading element and therefore the brake lining are connected via hydraulic lines to a pressure transducer which is attached to the frame of the mass to be decelerated and has a supporting cylinder and a supporting piston which projects into the supporting cylinder. As a result of the pivoting of the spreading element, the supporting piston is pushed into the supporting cylinder, which causes pressure to be applied to the hydraulic fluid of the supporting cylinder. The supporting cylinder is connected to a further spreading element via hydraulic lines.

DE 43 04 905 A1 describes a self-energizing brake which is based on purely mechanical principles.

DE 15 30 869 describes a hydraulic brake system with a brake actuator which is connected to a brake lining via a brake applying device. Furthermore, an additional pressure transducer in the form of a cylinder bore is provided, wherein the cylinder bore is filled with a hydraulic fluid, and after the frictional locking between the brake disk and the brake lining the hydraulic fluid is compressed by a plunger. This compression amplifies the braking force in the brake actuator, with the result that brake boosting occurs.

The device of the generic type has the disadvantage that the braking force or the deceleration force can be regulated only by means of a brake pedal. The actual regulating process is therefore carried out by a user initiating the braking process. However, such regulation of the braking process is insufficient, in particular in rail vehicles.

BRIEF SUMMARY OF THE INVENTION

The object of the invention is therefore to make available a device of the type mentioned at the beginning which permits controlled braking independently of an activation force.

The invention solves this problem by virtue of the fact that regulating means set the braking force as a function of a predefined setpoint value.

Within the scope of the invention, regulating means are provided which permit precise regulation of the braking process despite the self-energization. According to the invention, there is provision for a setpoint value, with which, for example, the degree of braking can be determined, to be preset. Within the scope of the invention, the braking process is therefore no longer carried out as a function of the muscular force of a user. Instead, within the scope of the invention, a setpoint value can be preset, for example, by using electrical resources. The setpoint value is, for example, variable and is derived from the weight of the mass to be decelerated. This permits predictable and precise braking operations to be carried out. The mass to be decelerated is, for example, a motor vehicle, a rail vehicle, a machine or the like.

The regulating means are advantageously configured to regulate the deceleration force. The deceleration force in the friction radius is equal here to the frictional force which acts during frictional locking between the braking surface, such as for example a rotating brake disk, and the brake lining, and it therefore constitutes a parameter with which the negative acceleration of the mass which occurs can be precisely predicted. In particular in the case of vehicles, the regulation of the deceleration force therefore permits the deceleration of the vehicle to be set extremely precisely. The deceleration force can be detected within the scope of the invention as an actual value by any desired sensors, such as for example accelerometers or force meters, strain gauges or the like.

However, the deceleration force is advantageously regulated by regulating the supporting pressure of the hydraulic fluid in the supporting cylinder, the regulating means being configured to do this. Owing to the connection between the brake lining and the pressure transducer, the pressure of the hydraulic fluid in the supporting cylinder can be used as a measure of the deceleration force. The supporting pressure, and therefore the deceleration force, are detected here, for example, by means of calibrated pressure transducers which generate an electrical signal, for example an electrical voltage, which is proportional to the pressure in the supporting cylinder. This voltage is then used for the further regulation process as an actual value, and therefore as a measure of the supporting pressure.

The brake lining is expediently connected to the supporting cylinder via the connecting means, with the supporting piston being attached to the frame. This variant of the invention permits particularly compact manufacture of the device according to the invention since all the cylinders and lines which are filled with hydraulic fluid can, for example, be combined to form one component. In particular common manufacture of these components is made possible. All that is necessary is to attach the supporting piston or the supporting rod which protrudes from the supporting piston, out of the supporting cylinder, with its free end facing away from the piston rod to the frame of the mass to be decelerated.

According to one refinement of the invention which differs from this, the brake lining is connected to the supporting piston via the connecting means, with the supporting cylinder being attached to the frame.

According to one expedient refinement of the invention, the supporting cylinder of the pressure transducer is divided into a supporting chamber and into a supporting return chamber by the supporting piston, with the regulating means being configured to regulate the difference in pressure between the hydraulic pressure in the supporting chamber and the hydraulic pressure in the supporting return chamber. According to this expedient development, self-energization of the braking process is possible and said process can be regulated simultaneously in both directions of travel. This advantage is significant in particular in vehicles as a mass which is to be decelerated and which generally travel in both directions. The supporting chamber and the supporting return chamber advantageously communicate with a high pressure line or low pressure line via nonreturn valves.

Compression springs are advantageously arranged in the supporting cylinder. When there is a drop in pressure, the compression springs cause the supporting piston to migrate back into a normal position. If, for example, the supporting piston were already arranged in the vicinity of a terminating wall of the supporting cylinder when a braking process is initiated, there would be the risk of a failure of the brake since the supporting piston could be pressed against the terminating wall by the brake lining.

Compression springs are expediently provided in the supporting chamber and in the supporting return chamber, with a pressure transducer return valve being provided for equalizing the pressure between the supporting chamber and the supporting return chamber, and with a control unit initiating the pressure equalization by means of the pressure transducer return valve and the compression springs. According to this advantageous development, the pressure transducer can be moved into its normal position even if the supporting cylinder is a cylinder which has two chambers. In this context, the pressure transducer return valve ensures that pressure equalization occurs between the supporting chamber and the supporting return chamber, wherein the compression springs which are arranged in the respective chambers ensure that the supporting piston is correspondingly slid within the supporting cylinder. If the supporting piston is again in its initial position, which is advantageously the center position, a renewed braking process can be initiated without the risk of the supporting piston impacting against a boundary wall of the supporting cylinder so that a serious braking fault occurs.

The regulating means advantageously comprise pressure detection means for detecting a pressure value or a pressure difference value as an actual value, a comparator which compares a predefined setpoint value with the actual value by acquiring a difference value, a regulating unit and the brake valve for setting the pressure of the hydraulic fluid in the brake actuator, with the regulating unit acting on the brake valve in such a way that the difference value is minimized. As has already been indicated above, the pressure detection means are implemented, for example, as pressure/voltage converters or pressure/current converters, and in this context, for example, a calibrated pressure/voltage converter generates a calibrated voltage value which corresponds to the pressure in the supporting cylinder or in the brake actuator, and said voltage value is then used as the actual value to be regulated during the regulating process. If cylinders are used which have two chambers on different sides of the piston within the cylinder, two pressure/voltage converters or pressure/current converters are used to form the pressure difference value, and each converter is arranged in a chamber here. The difference value of the converters, or in other words the actual value, is subsequently fed to a comparator which compares the actual value with a predefined setpoint value. The setpoint value is predefined, for example, by the driver of a vehicle, a safety device or a superordinate control system. The comparator generates a difference value from the actual value and the setpoint value, and a regulating unit connected downstream of the comparator is configured to minimize the difference value here. In this context, the regulating unit comprises an expedient regulator which acts on the brake valve. The brake valve is configured to set the pressure of the hydraulic fluid, preferably in the brake actuator. The pressure of the hydraulic fluid in the brake actuator determines the pressing-on force which is applied to the brake lining via the coupling element. In this context, the applied pressing-on force with which the brake lining is pressed against the brake disk is oriented essentially at a right angle to said brake disk.

According to a development which is expedient in this regard, the brake valve interacts with a fluidic high pressure circuit and a fluidic low pressure circuit.

The brake valve can be, for example, a single analog brake valve or can comprise a plurality of analog brake valves.

In a variant of this, the brake valve comprises a multiplicity of digital braking units, with each braking unit having two switched positions.

According to one preferred refinement, the brake valve is an analog slider valve, with the regulating unit being an analog regulator or a digital regulator with an analog or pulse-modulated output. The slider valve has, for example, two outputs which can be applied to the two chambers of a cylinder. On the input side, the slider valve is connected to the hydraulic lines and advantageously to a high pressure circuit and a low pressure circuit. The pressure difference in the cylinder is determined by the mechanical position of a mechanically displaceable sliding component. In this context, any desired pressure differences which lie within the input-side pressure difference between, for example, a fluidic low pressure circuit and a fluidic high pressure circuit, can be generated. Furthermore, within the scope of the invention it is also possible for the analog slider valve to have just a single output, while the brake actuator has just one chamber. Any desired pressures within the pressure difference between the high and the low pressure circuits present on the input side can be set at the output of the slider valve. The slider valve can be triggered, for example, by electromagnetically generated forces. The slider valve is advantageously a proportional valve.

According to a refinement of the invention which differs from the above, the brake valve comprises a series of switching valves with two switched positions, with the regulating unit being a digital regulating unit or an analog regulating unit with a digital converter. According to this refinement, the brake valve is composed of a series of two position switching valves, with each two position switching valve being connected on the input side to the fluidic high pressure circuit and to the fluidic low pressure circuit, or in other words communicating with it. On the output side, each switching valve is connected to the brake actuator. It is therefore possible, as it were, to set the pressure in the brake actuator in a digital fashion. In this context, the two position switching valves are switched by the control unit in, for example, a millisecond cycle.

The coupling element advantageously comprises a lever mechanism. According to this expedient development, the brake lining is not connected to the brake piston of the brake actuator by a simple push rod. Instead, the braking movement which is generated by the brake actuator is applied to the brake lining in the course of the lever mechanism until the brake lining engages in the brake disk, and frictional locking therefore occurs between these two components.

According to one advantageous development, the brake actuator comprises a brake cylinder which is filled with hydraulic fluid and a brake piston, which brake cylinder and brake piston can move relative to one another. However, in contrast to this customary embodiment of the brake actuator, other brake actuators which are known as such to a person skilled in the art can also be used within the scope of the invention.

The brake piston is expediently permanently connected to the coupling element.

According to one preferred refinement of the invention, the brake cylinder is divided into a braking chamber and into a braking return chamber by the brake piston. In other words, the brake cylinder is embodied as a differential cylinder. The braking force which is set is therefore dependent essentially on the pressure difference between the braking chamber and the braking return chamber.

According to a further advantageous embodiment of the invention, the coupling element comprises a brake rod which extends through the braking return chamber. According to this advantageous development of the invention, when there is a pressure equilibrium between the braking chamber and the braking return chamber a greater force is generated in the braking chamber owing to the larger surface of the brake piston in the braking chamber, with the result that when there is an equilibrium of pressure the brake piston is pushed out of its center position. This is advantageous, for example, to initiate a safety braking process when there is a loss of pressure. The action of a prestressing spring may be added to this.

The brake actuator advantageously comprises a brake cylinder and a brake piston which divides the brake cylinder into a braking chamber and into a braking return chamber, it being possible to connect the braking chamber and the braking return chamber both to a fluidic high pressure circuit and to a fluidic low pressure circuit by means of a brake valve.

According to an advantageous development of the invention, a prestressing spring is provided for pressing the brake lining against the brake disk. The prestressing spring can basically be arranged in any desired way within the scope of the invention. If no pressure is present in the hydraulic lines, the brake lining continues to be pressed against the brake disk by the force of the prestressing spring.

A high pressure vessel, which is part of a high pressure circuit, and a low pressure vessel, which is part of a low pressure circuit, are advantageously provided for making available hydraulic fluid, with the high pressure circuit and the low pressure circuit being connected to the brake valve.

The brake valve is expediently provided for generating any desired pressures in the brake actuator, with the pressures which can be generated being in the region of the pressure difference between the high pressure circuit and the low pressure circuit.

According to one expedient development in this regard, each high pressure vessel and each low pressure vessel is respectively equipped with a nonreturn valve and a throttle. If the pressure in the high pressure vessel or in the low pressure vessel exceeds the pressure in the high pressure circuit or in the low pressure circuit, respectively, further hydraulic fluid is fed into the hydraulic circuit from the respective pressure vessel via the throttle so that a sufficient quantity of hydraulic fluid is always available. The accumulator can be charged quickly via the nonreturn valve with a low pressure loss. The dynamics of the charging/discharging process for the application can be optimized by suitably selecting the throttle and the nonreturn valve.

BRIEF DESCRIPTION OF THE SEVERAL VIEWS OF THE DRAWING

Further expedient embodiments and advantages of the invention are the subject matter of the following description of exemplary embodiments of the invention with reference to the figures of the drawing, in which identical reference symbols refer to identically acting components, and in which:

FIGS. 2A-2C show a second exemplary embodiment of the device according to the invention.

DESCRIPTION OF THE INVENTION

Figures 1A, 1B:
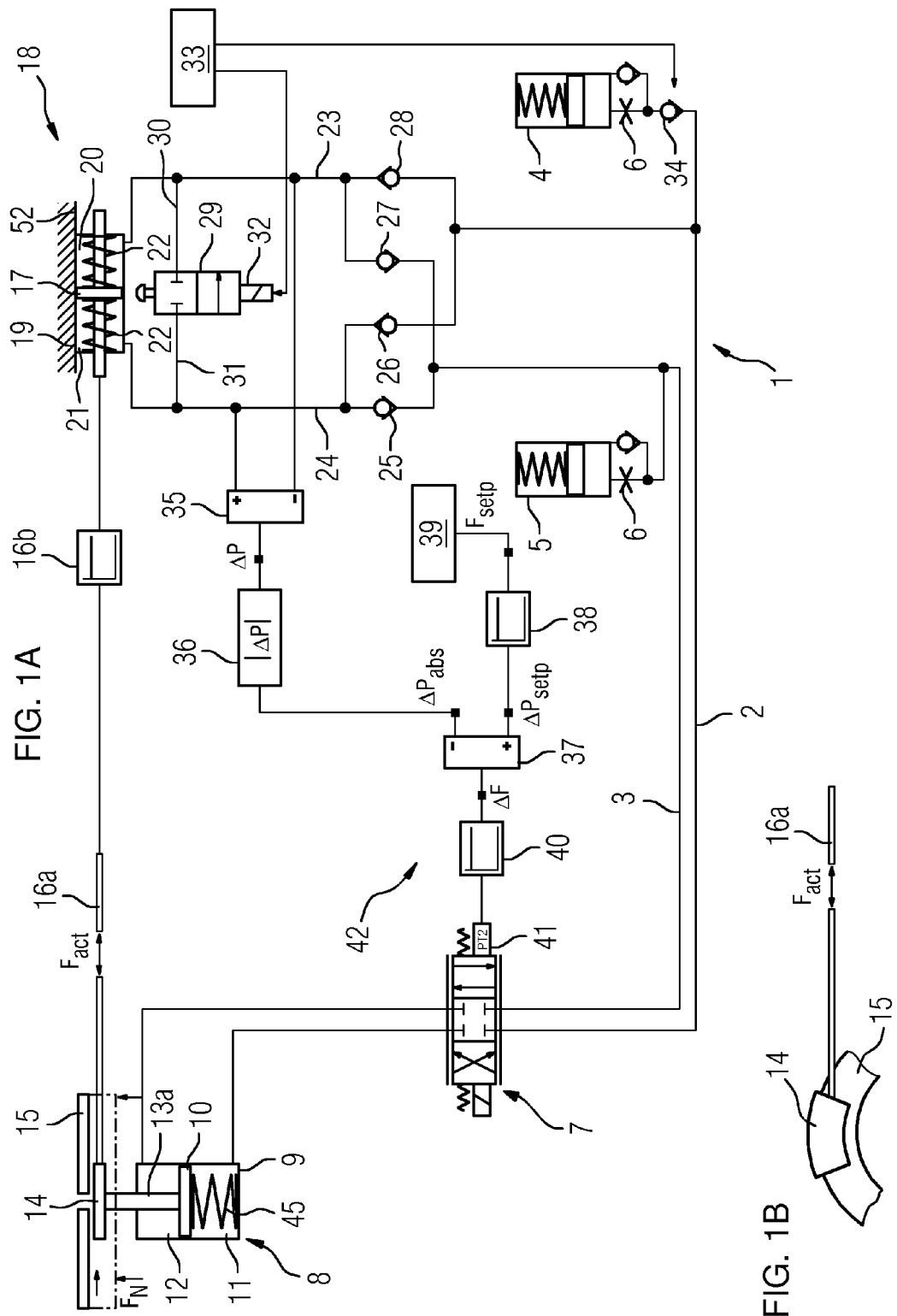
FIGS. 1A-1C show a first exemplary embodiment of the device according to the invention.
Figure 1C:
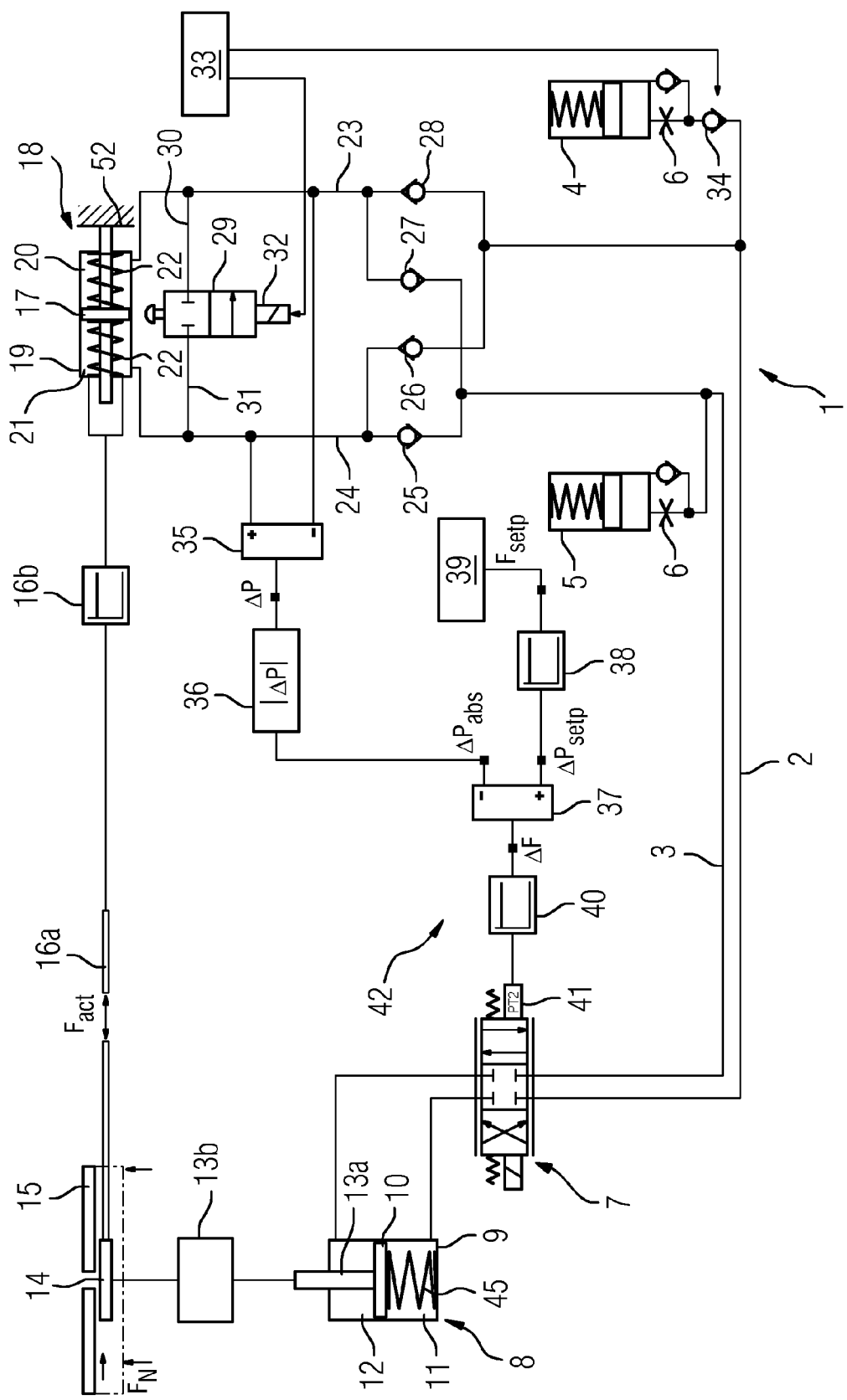

FIGS. 1A-1C show a first exemplary embodiment of the device 1 according to the invention in a schematic illustration. The device 1 according to the invention comprises a high pressure circuit 2 and a low pressure circuit 3, which high pressure circuit 2 and low pressure circuit 3 respectively communicate with a high pressure vessel 4 or with a low pressure vessel 5. The high pressure vessel 4 and the low pressure vessel 5 are each equipped with a combination of a throttle and a nonreturn valve 6 via which said vessels are connected to the respective hydraulic line 2, 3. If the pressure in the respectively assigned hydraulic line 2, 3 is less than in the high pressure vessel 4 or the low pressure vessel 5, hydraulic fluid leaves the respective pressure vessel 4, 5 and is made available to the system. This counteracts a shortage of hydraulic fluid. The high pressure circuit 2 and the low pressure circuit 3 are connected via an analog slide regulating valve 7 as a brake valve to a brake actuator 8 which has a brake cylinder 9. The brake cylinder 9 is divided into a braking chamber 11 and a braking return chamber 12 by a brake piston 10. A coupling rod 13a extends as a coupling element from the pressure piston 10 to a brake lining 14 which is provided for pressing against a brake disk 15. The coupling element 13a additionally includes a lever mechanism 13b. In FIGS. 1A-1C, the brake disk 15 and the brake lining 14 are shown in a plan view and in a side view.

In the illustration shown in FIGS. 1A -1C, it is possible to see that the brake lining 14 is connected to the supporting piston 17 of a pressure transducer 18 via supporting means 16a, such as, for example, a simple rod or any other desired lever mechanism. The pressure transducer 18 has a supporting cylinder 19 in addition to the supporting piston 17. The supporting piston 17 divides the supporting cylinder 19 into a supporting chamber 20 and into a supporting return chamber 21. Compression springs 22 are respectively arranged in the supporting chamber 20 and in the supporting return chamber 21. The supporting cylinder 19 is attached to a frame 52.

The brake lining 14 is mounted so as to be movable tangentially with respect to the direction of rotation of the rotary disk 15, and is therefore supported on the pressure transducer which is attached to the bogie of a rail vehicle.

The supporting chamber 20 and the supporting return chamber 21 are each connected via expedient hydraulic lines 23 or 24 to the high pressure circuit 2 or the low pressure circuit 3. In this context, the hydraulic lines 23, 24 communicate with nonreturn valves 25 to 28. The nonreturn valves 25, 26 which are arranged in the hydraulic line 24 of the supporting return chamber 21 are oriented in opposite directions to one another. If there is a higher pressure in the supporting return chamber 21 than in the low pressure circuit 3, the nonreturn valve 25 closes the connection between the hydraulic line 24 and the low pressure circuit 3. If, on the other hand, the pressure in the supporting return chamber 21 is higher than that in the high pressure circuit 2, the nonreturn valve 26 opens so that fluid, such as for example a suitable hydraulic fluid, is expelled from the supporting return chamber 21 and transferred into the high pressure vessel 4. If the pressure in the supporting return chamber 21 is, on the other hand, lower than in the low pressure circuit 3, the valve 25 opens so that an inflow of hydraulic fluid out of the low pressure vessel 5 into the supporting return chamber 21 is made possible. The same applies to the interaction between the supporting chamber 20 and the nonreturn valves 27, 28 via the hydraulic line 23.

In addition, FIGS. 1A-1C show a pressure transducer return valve 29 which communicates with the supporting chamber 20 or the supporting return chamber 21 via hydraulic lines 30 and 31. The pressure transducer return valve 29 has a slider element 32 which, when activated, brings about the pressure equilibrium between the supporting chamber 20 and the supporting return chamber 21.

If a pressure equilibrium is present, the compression springs 22 move the supporting piston 17 back into the center position shown in FIG. 1. This avoids the supporting piston 17 being moved against a boundary of the supporting cylinder 19, therefore interrupting the brake boosting. An expedient pressure equalizing control unit 33 is used to activate the pressure transducer return valve 29. The activation is carried out, for example, by means of electromagnetic forces.

The pressure equalizing control unit 33 also acts on a valve 34 which permits intentional decoupling of the accumulator 4 from the high pressure circuit 2 in order, for example, to reduce the supporting piston travel or for maintenance purposes. The valve 34 is opened in the normal operating mode.

The hydraulic lines 23 and 24 are each provided with calibrated pressure/voltage converters (not illustrated figuratively). Each pressure/voltage converter makes available at its output a voltage which is proportional to the pressure in the supporting chamber 20 or in the supporting return chamber 21. The output of each pressure/voltage converter is connected to the input of a difference generator 35. The difference generator 35 is connected on the output side to an absolute value generator 36 which calculates the absolute value |Δp| from the pressure difference Δp made available by the difference generator 35. The absolute value of the pressure difference |Δp| is ultimately applied to the input of a comparator 37. A setpoint pressure difference $\Delta p_{setp}$ is applied as a setpoint value to the second input of the comparator 37, which setpoint pressure difference $\Delta p_{setp}$ is calculated on the basis of a setpoint force $F_{setp}$ and as a function of a predefined area factor 38. The setpoint force $F_{setp}$ is input by a user of the device by means of an expedient control unit 39. The comparator 37 generates at its output a difference value ΔF which is applied to the input of a regulating unit 40, which then slides a sliding element 41 of the brake valve 7 in such a way that the difference value ΔF is minimized. The brake valve 7 is, for example, a proportional valve.

A prestressing spring 45 is used to press the brake lining 14 against the brake disk 15. The prestressing spring 45 presses the brake lining against the brake disk if a pressing-on force cannot be generated hydraulically.

The method of operation of the device 1 according to the invention is as follows: in order to apply a braking process a set point force $F_{setp}$ is requested using the regulating means 42. The regulating means 42 comprise the control unit 39, the measuring sensors (not illustrated figuratively), the difference generator 35, the absolute value generator 36, the area factor generator 38, the comparator 37, the regulating unit 40 and the brake valve 7. The pressure difference Δp between the supporting chamber 20 and the supporting return chamber 21 is equal to zero at the start of the braking process, with the result that a large difference value ΔF is generated by the comparator 37. The regulating unit 40 subsequently slides the sliding element 41 to the left, with the result that a large pressure difference is generated between the braking chamber 11 and the braking return chamber 12. In this context, the pressure in the braking chamber 11 is higher than in the braking return chamber 12. The brake piston 10 is slid and as a result a pressing-on force $F_N$ is applied to the brake disk 5 in the direction indicated by the arrows. A frictional force, or in other words, a deceleration force $F_{act}$ which is directed tangentially with respect to the direction of rotation of the brake disk is generated by the frictional locking between the brake lining and the brake disk. The deceleration force $F_{act}$ is applied to the supporting piston 17 via the connecting means 16b, that is to say the lever mechanism, by virtue of the movable mounting of the brake lining 14. When the brake disk 15 rotates in the clockwise direction out of the position shown in FIGS. 1A and 1C, the supporting piston 17 is slid to the right. The pressure of the hydraulic fluid in the supporting chamber 20 is therefore increased compared to the pressure of the hydraulic fluid in the supporting return chamber 21. The pressures are each detected by the pressure/voltage converter and applied to the input of the difference generator 35. This brings about a pressure difference Δp at the output of the difference generator 35, and therefore gives rise to a corresponding absolute value |Δp| or absolute value at the output of the absolute value generator 36. The difference value ΔF becomes smaller, in which case the regulating unit 40 ensures, in the further course of the regulating process, that the difference value ΔF is ultimately minimized. In other words, the invention provides self-energization and simultaneous regulation of the braking force.

Figure 2C:
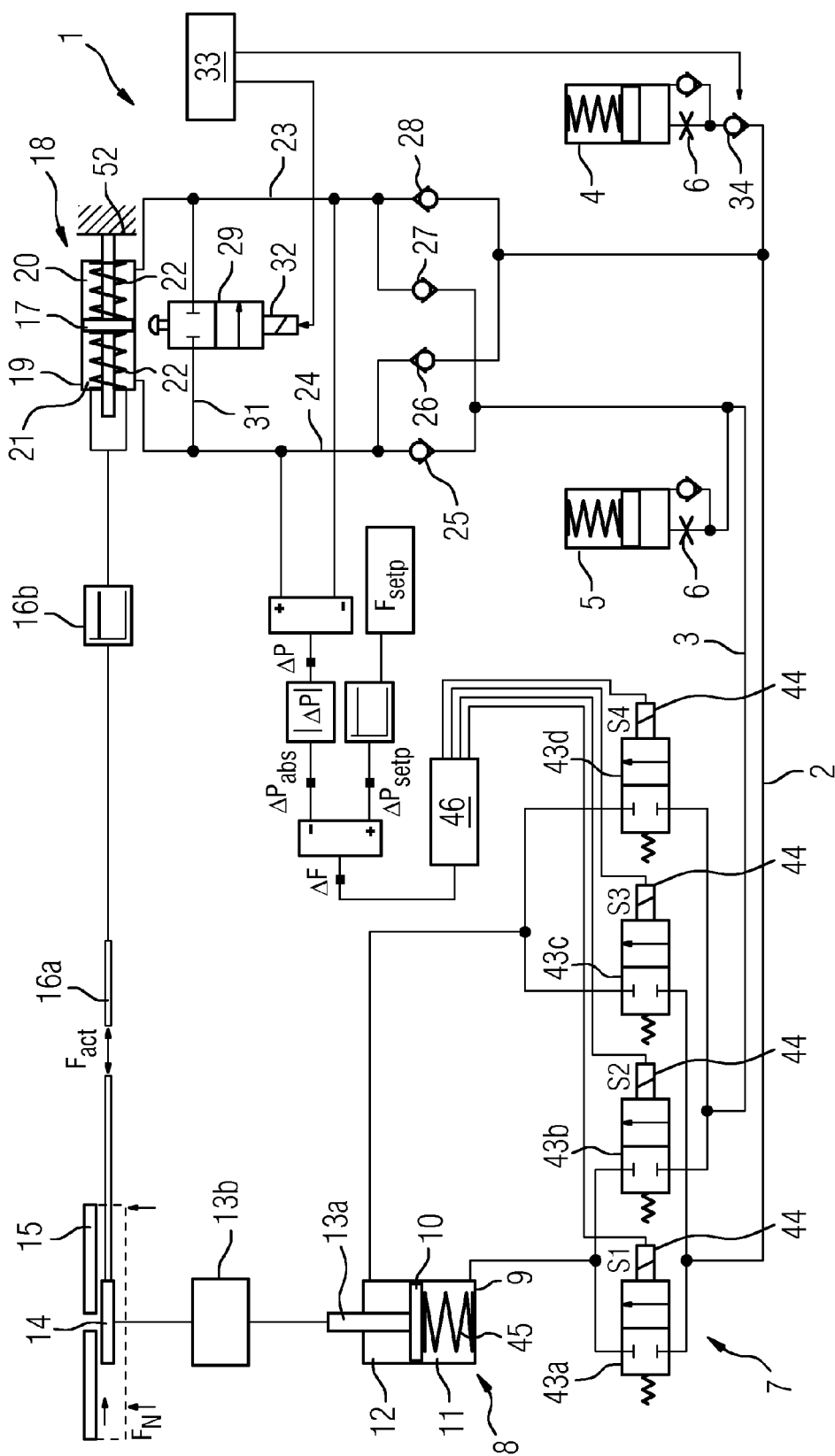

The exemplary embodiment according to FIGS. 2A-2C differs from the exemplary embodiment shown in FIGS. 1A-1C essentially in the way in which the brake valve 7 is embodied. The brake valve 7 in FIGS. 2A and 2C has a plurality of switching valves 43a, 43b, 43c and 43d which each have just two switched positions. One sliding element 44 of each switching valve 43a . . . 43d is used here to select the respective switched position. In the first switched position, the connection between the inlet and the outlet of the switching valve 43 is interrupted. In a second switched position, the inlet pressure of each switching valve 43a . . . 43d is also applied on the outlet side. The switching valves 43a and 43c are connected to the high pressure circuit 2, and the switching valves 43b and 43d are connected to the low pressure circuit 3. If the valve 43a is moved, for example, into its open position, the pressure of the high pressure circuit 2 is applied to the outlet of the switching valve 43a. In other words, the braking chamber 11 communicates with the high pressure circuit 2. If the pressure of the low pressure circuit 3 is applied to the braking return chamber 12 by sliding the sliding element 44 of the switching valve 43d into its open position, the pressure difference which is generated by the brake actuator 18, and therefore the braking force, are at a maximum.

The remaining regulating means 42 differ from the regulating means 42 shown in FIGS. 1A and 1C only in having a digital regulator 46 which is known as such to a person skilled in the art, so that it is not necessary to give details thereon here. The digital regulator 46 is configured to slide the sliding element 44 of each sliding valve in a millisecond cycle. In this context, a corresponding logic, which is stored in the digital controller, is used to bring about the desired process of regulating the braking. Virtually any pressure differences can be generated in the brake cylinder 8 by the brief switching operation.

The invention claimed is:

1. A device for braking a moving mass, the device comprising: a brake lining;
   a braking surface;
   a movably guided coupling element for pressing said brake lining against said braking surface;
   a brake actuator having a brake cylinder, said brake actuator being filled with hydraulic fluid and connected to said coupling element for generating a pressing-on force to be applied through said coupling element to said brake lining; a pressure transducer to be attached to a frame of the mass to be braked, said pressure transducer having a supporting cylinder filled with hydraulic fluid and a supporting piston interacting with said supporting cylinder; a connecting device connected between said pressure transducer and said brake lining;
   hydraulic lines communicating between said supporting cylinder and said brake cylinder; and
   a regulating device setting a braking force as a function of a predefined setpoint value;
   said supporting cylinder is divided into a supporting chamber and a supporting return chamber by said supporting piston;
   said regulating device is configured to regulate a difference in pressure between hydraulic pressure in said supporting chamber and hydraulic pressure in said supporting return chamber;
   said regulating device including:
      a pressure detection device for detecting a pressure difference value $\Delta p$;
      a difference generator to generate the absolute value from the pressure difference as an actual value $\Delta p_{abs}$;
      a comparator for comparing a predefined setpoint value $\Delta p_{setp}$ with said actual value $\Delta p_{abs}$ by acquiring a difference value $\Delta F$;
      a regulating unit; and
      a brake valve for setting a pressure of the hydraulic fluid in said brake actuator, said regulating unit acting on said brake valve to minimize said difference value $\Delta F$;
   said hydraulic lines including a fluidic high pressure circuit and a fluidic low pressure circuit communicating with said brake valve.

2. The device according to claim 1, wherein said connecting device is connected between said brake lining and said supporting cylinder, and said supporting piston is attached to the frame of the mass to be braked.

3. The device according to claim 1, wherein said connecting device is connected between said brake lining and said supporting piston, and said supporting cylinder is attached to the frame of the mass to be braked.

4. The device according to claim 1, which further comprises compression springs disposed in said supporting cylinder.

5. The device according to claim 1, which further comprises compression springs disposed in said supporting chamber and in said supporting return chamber, a pressure transducer return valve for equalizing pressure between said supporting chamber and said supporting return chamber, and a control unit initiating pressure equalization by said pressure transducer return valve and said compression springs.

6. The device according to claim 1, wherein said brake valve is an analog slider valve and said regulating unit is an analog regulator or a digital regulator with an analog or pulse-modulated output.

7. The device according to claim 1, wherein said brake valve includes a series of switching valves with two switched positions, and said regulating unit is a digital regulating unit or an analog regulating unit with a digital converter.

8. The device according to claim 1, wherein said coupling element includes a lever mechanism.

9. The device according to claim 1, wherein said brake cylinder of said brake actuator is filled with hydraulic fluid, said brake actuator has a brake piston, and said brake cylinder and said brake piston are movable relative to one another.

10. The device according to claim 9, wherein said brake piston is connected to said coupling element.

11. The device according to claim 9, wherein said brake cylinder is divided into a braking chamber and a braking return chamber by said brake piston.

12. The device according to claim 11, wherein said coupling element includes a brake rod extended through said braking return chamber.

13. The device according to claim 1, which further comprises a prestressing spring for pressing said brake lining against said braking surface.

14. The device according to claim 1, which further comprises a high pressure vessel and a low pressure vessel for making hydraulic fluid available.

15. The device according to claim 14, which further comprises a nonreturn valve and a throttle connecting said high pressure vessel and said low pressure vessel to said hydraulic lines and to said supporting cylinder, and a brake valve connecting said high pressure vessel and said low pressure vessel to said brake cylinder.

* * * * *